UNITED STATES PATENT OFFICE.

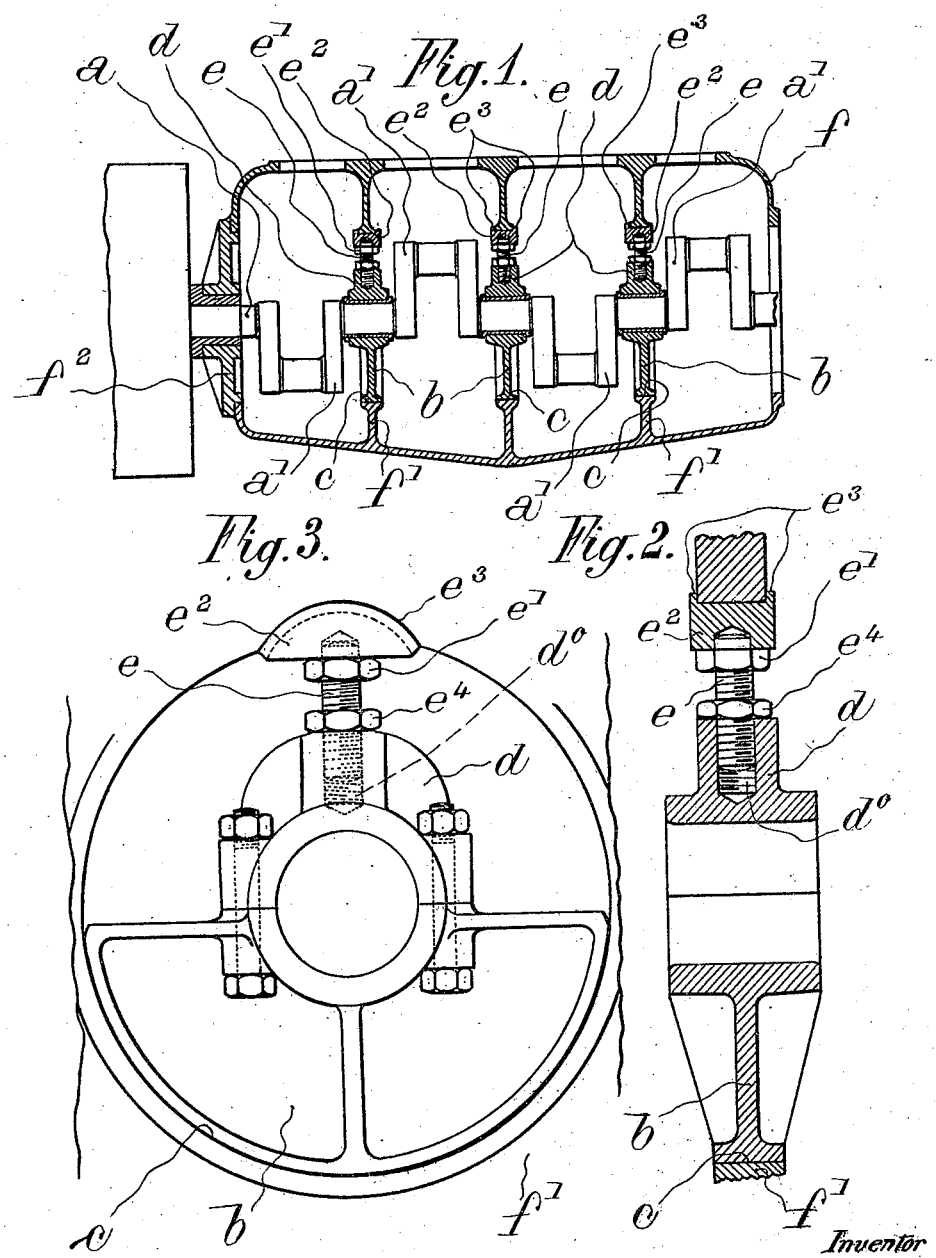

HENRI VICTOR JULES JOUFFRET, OF NEUILLY-SUR-SEINE, FRANCE, ASSIGNOR TO THE SOCIETY "ANCIENS ETABLISSEMENTS CAFFORT FRERES," OF PARIS, FRANCE.

ENGINE OR MOTOR.

1,401,784.      Specification of Letters Patent.      Patented Dec. 27, 1921.

Application filed December 15, 1919. Serial No. 345,086.

*To all whom it may concern:*

Be it known that I, HENRI VICTOR JULES JOUFFRET, a citizen of the French Republic, and resident of Neuilly-sur-Seine, Seine, France, have invented certain new and useful Improvements Relating to Engines or Motors, of which the following is a specification.

This invention relates to engines or motors and refers more particularly to those provided with crank shafts supported in casings, although the invention may be adapted for other types of engines, where found suitable.

The object of the invention is to construct engines or motors of the type in question so that the placing of the crank shaft in position and its removal, and the construction of the casing which supports the said shaft may be effected more simply and in a more practical manner and consequently more economically than has hitherto been the case.

The invention consists essentially in providing the crank shaft of the engine or motor with bearings adapted to rest upon supports located in the casing, the upper portion of the bearings being provided with an extension, the vertical position of which is adapted to be adjusted by appropriate means, such for instance as a screw. The casing is formed from a single piece and the device comprising the crank shaft and the attached bearings is inserted through an opening in the casing, so as to rest on the said supports, after which each screw is so adjusted that it exerts pressure upon the wall of the casing opposite to that carrying the support.

The invention includes, in addition to the principal arrangement just described, certain other arrangements which will be more fully explained hereafter.

It also includes certain constructional embodiments of the said arrangements, and as new industrial products, engines of the class in question, with the arrangements applied thereto special parts suitable for the construction of such motors, and automobile vehicles and installations comprising such engines.

In order that the invention may be clearly understood, it will now be described with reference to the accompanying drawing, the description and drawing being however merely given by way of example.

Figure 1 of the drawing shows diagrammatically in axial section a crank shaft mounted in its casing according to one method of carrying out the invention.

Figs. 2 and 3 show to a larger scale, also diagrammatically, and respectively in section in the same plane as Fig. 1 and in elevation in a plane perpendicular to the preceding, a detail of the arrangements.

In the embodiment of the invention illustrated in the drawing, $a$ is a crank shaft, having a plurality of cranks $a^1$, which it is desired to mount in a casing in a simple and economical manner, and so that the said shaft can be easily placed in position or removed. $b$ is a member adapted to constitute the lower portion of the bearing for the shaft $a$ and having a base or edge $c$, extending in the circumferential direction around the axis of the shaft $a$. The upper member of the bearing is provided at the top with a boss $d$, of appropriate size, in which is provided in a direction passing through the axis and the middle of the base $c$, a hole $d^1$, adapted to receive a screw threaded rod $e$, the upper end of which is provided with a six sided extension or nut $e^1$ and with a plain portion adapted to engage in a piece $e^2$.

The piece $e^2$ is extended on the outside into two projecting portions $e^3$, opposite and parallel to one another. $e^4$ is a nut screwing on to the rod $e$.

The crank shaft $a$ is fitted between any two of its cranks with a bearing constructed as just described.

$f$ is a casing which is formed in a single piece and of a size suitable for the reception of the crank shaft upon which the bearings have been fitted. This casing is provided with an opening into which the shaft thus fitted can be passed, and with other openings for the passage of the connecting rods when the crank shaft is in position. $f^1$ are webs provided with openings concentric with the crank shaft and of a radius equal to the base $c$ of each bearing, so that the edges of the openings serve to support the circular bases $c$ of the bearings. The edges are of a thickness substantially equal to the distance between the projections $e^3$ of the pieces $e^2$.

Where each of the pieces $e^2$ rests against the casing, a recess is provided corresponding to the profile of the piece $e^2$.

It will be readily understood that if the screws $e$ are turned into a position at which the extremities of the projections $e^3$ are at a distance from the axis of the crank shaft slightly less than the distance of the said axis from the edges of the recesses it is possible, after having passed the crank shaft into the opening in the casing to pass it through the openings in the webs $f^1$, and then to rest the lower edges of the bearings on the edges of the webs intended to support them. When this has been done, the screws $e$ are turned so as to press the pieces $e^1$ toward the recesses. The edges of the recesses engage the projections $e$ and the screws are turned to the desired extent. Finally the nut $e^4$ in each bearing is screwed against the boss $d$.

It is to be understood that the fitting up of the crank shaft may be completed, by supporting its extremities by means of bearings $f^2$, which may be identical with those already described, openings in the casing adapted to receive them being provided for that purpose.

It will be seen with this arrangement that the mounting of the crank shaft in its casing and its removal are effected in a more practical manner than has hitherto been the case. The casing moreover is of more simple construction and therefore cheaper than two part casings generally employed.

As already stated the invention is not limited to the particular construction herein described and shown on the accompanying drawing, but includes all modifications coming within a fair interpretation of the claims.

What I claim as my invention and desire to secure by Letters Patent of the United States of America is:—

1. In combination a crank case, a web in said crank case having an aperture therethrough, a crank shaft, a bearing surrounding said crank shaft provided with extensions, said bearing and extensions being freely insertible within the aperture in said web, adjusting means coöperable directly with one of said extensions for forcing said extensions into clamping engagement with the periphery of the aperture in said web.

2. In combination a crank case, a web in said crank case having an aperture therethrough, a crank shaft within said crank case, a bearing on said crank shaft, said bearing having an integral extension on one side thereof freely fitting said aperture and an extension on the other side thereof having a radially movable portion freely fitting said aperture when in retracted position, adjusting means carried by said bearing and constructed to force said integral and movable extensions into clamping engagement with the periphery of the aperture in said web.

3. In combination a crank case, a web within said crank case having an aperture therethrough, a crank shaft within said crank case, a bearing surrounding said crank shaft, said bearing having an integral extension on one side freely fitting the periphery of the aperture in said web and a boss on the other side having a threaded bore extending thereinto, a threaded rod engaging in said threaded bore and carrying at its outer end a member engageable with the periphery of said aperture.

4. In combination a crank case, a web within said crank case having an operture therethrough, a crank shaft in said crank case, a bearing surrounding said crank shaft, an extension on one side of said bearing freely fitting the aperture in said web, and a boss on the other side of said bearing, a threaded rod radially adjustable in an aperture in said boss, a wrench hold on said rod, a swivelly mounted member on said rod engageable with the periphery of the aperture in said web.

5. In combination a crank case, a web within said crank case having an aperture therethrough, a crank shaft in said crank case, a bearing surrounding said crank shaft, an extension on one side of said bearing freely fitting the aperture in said web, a boss on the other side of said bearing, a threaded rod radially adustable in an aperture in said boss, a wrench hold on said rod, a swivelly mounted member on said rod engageable with the periphery of the aperture in said web and spaced flanges on said swivelly mounted member adapted to embrace said web.

6. In combination a crank casing, a web in said casing having an aperture therethrough, a bearing for a crank shaft within the aperture in said web, an arcuate key-way in said web forming part of said aperture, a key radially adjustable with respect to said bearing and means for forcing said key into said key-way.

7. A crank case, a web within said crank case having an aperture therethrough, a crank shaft within said crank case, a bearing surrounding said crank shaft, said bearing having extensions thereon freely fitting within the aperture in said web, an end portion for said crank case having an aperture of sufficient size to admit said bearing with the extensions thereon, said crank shaft and bearing being insertible through said aperture.

8. In combination a crank casing, a web in said casing having an aperture therethrough, a bearing for a crank shaft within the aperture in said web, an arcuate key-way in said web forming part of said aperture, a key radially adjustable with respect to said bearing and means carried by said bearing for forcing said key into said key-way.

9. In combination a crank case, a web within said crank case provided with an aperture having on one side a circumferential portion of its periphery of one radius and on the other side a circumferential portion of its periphery of a smaller radius, a crank shaft within said crank case, a bearing surrounding said crank shaft having an integral extension on one side fitting that part of the periphery of the aperture in said web of the larger curvature, and a movable extension on the opposite side fitting that part of the periphery of the aperture in said web having a smaller curvature, adjusting means between said bearing and said smaller extension for forcing said smaller and larger extensions into engagement with their respective portions of the periphery of said aperture for both frictionally and positively holding said bearing against displacement.

In witness whereof I affix my signature.

HENRI VICTOR JULES JOUFFRET.